United States Patent Office

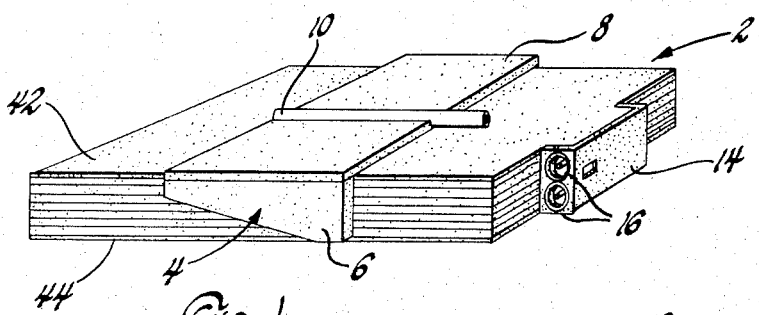
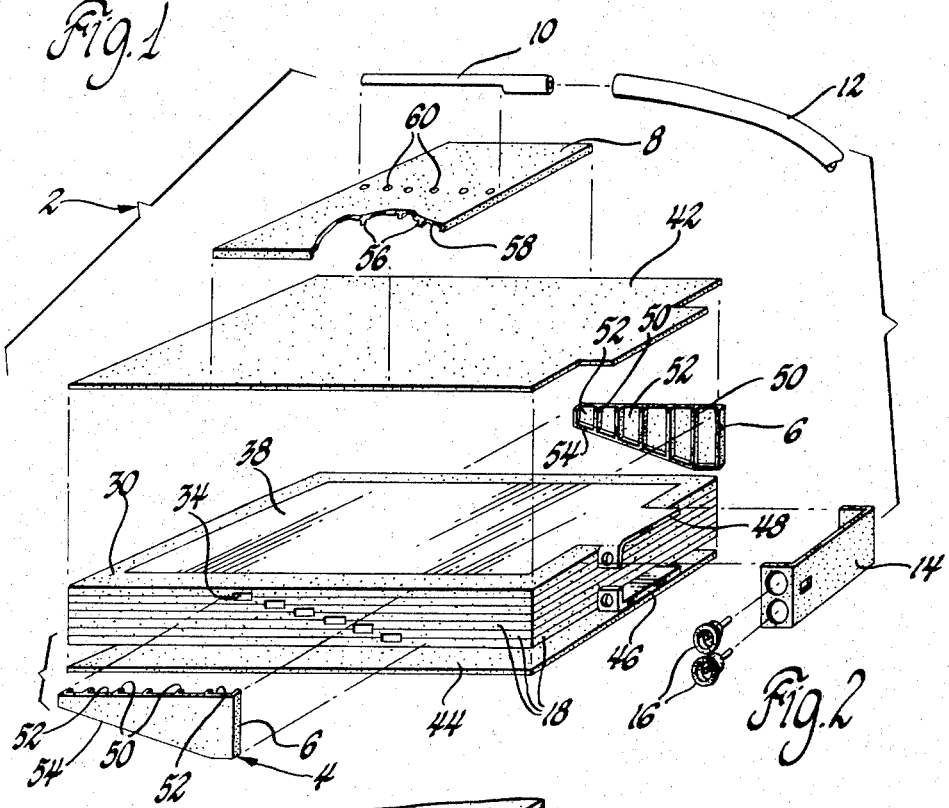
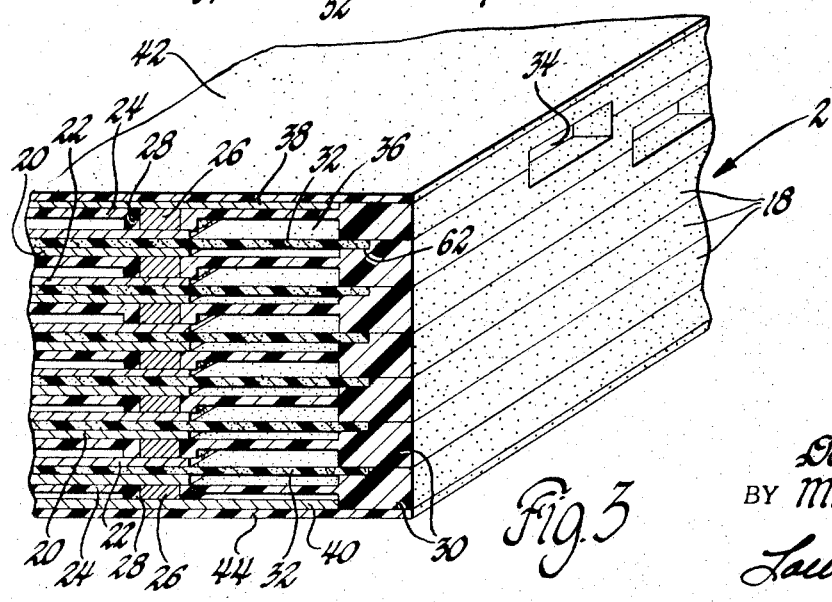

3,728,158
Patented Apr. 17, 1973

3,728,158
LOW SILHOUETTE BI-POLAR BATTERY
David T. Poe, Gaston, and Murray G. Sandberg, Muncie, Ind., assignors to General Motors Corporation, Detroit, Mich.
Filed Nov. 16, 1971, Ser. No. 199,235
Int. Cl. H01m 39/06
U.S. Cl. 136—10                              2 Claims

ABSTRACT OF THE DISCLOSURE

A low-silhouette, bi-polar-electrode battery having a plurality of stacked cells separately venting through their respective sides via a multi-channeled venting system.

---

This invention relates to a bi-polar-electrode battery having a number of bi-polar-electrode half-cell elements stacked atop one another to provide the desired number of series connected cells. More particularly it relates low silhouette batteries of the type described in which the height of the battery is substantially less than its lateral dimensions, i.e. length and width. Batteries of this type offer automobile designers considerable flexibility as to location of the battery in a vehicle. For example, low silhouette batteries could readily be located under the driver's seat and out of the engine compartment. This would not only lessen the severity of the environmental conditions surrounding the battery (e.g. high temperatures), but also provide increased under-the-hood space for engine and accessory components.

The venting of vertically stacked bi-polar-electrode cells presents problems not encountered in the venting of serially aligned cells, e.g. conventional Pb-acid SLI batteries. In the conventional Pb-acid batteries, the gases generated in the cell rise to a space above the plates and from there are vented directly out the top of each cell. Electrolyte entrainment in the gases is minimal. In vertically stacked bi-polar-electrode batteries the gases cannot simply be vented directly through the top of each cell. Likewise, the use of a common manifold along the side of the battery communicating directly with each cell vent tends to cause intercell electrolyte leakage. The common side manifold is especially undesirable for low-silhouette batteries since the electrolyte leakage path along the side from one cell to the other is extremely short.

Accordingly, it is an object of the present invention to provide a low silhouette, bi-polar-electrode battery stack whose several cells are individually vented up the side of the battery to a venting manifold in a manner which precludes intercell electrolyte communication. This and other objects of this invention will become readily apparent from the detailed description thereof which follows.

FIG. 1 is a perspective view of a battery made in accordance with this invention.

FIG. 2 is an exploded perspective view of the battery in FIG. 1.

FIG. 3 is an enlarged, sectioned, perspective view of a portion of the battery shown in FIG. 1 showing the internal structure of the battery.

The figures show a bi-polar-electrode battery 2 including an individual cell venting means 4 containing risers 6 along at least one side of the battery, a header 8 across the top of the battery, a manifold 10 adjoining to the header 8 and an exhaust tube 12 for directing the cell's gases as desired. A terminal cap 14 encloses the battery's terminals 46, 48 which are located at one end of battery 2. Terminal jacks 16 extend through the terminal cap 14 for connecting the battery's terminals 46, 48 to appropriate external leads (not shown).

As best shown in FIG. 3, the bi-polar-electrode battery 2 has a plurality of half-cell elements 18 each of which are preassembled before stacking to form the battery. The half-cell elements 18 include positive plates 20, negative plates 22 and intercell dividers 24 which prevent direct electrolyte communication between the positive plate 20 and negative plate 22 of any one half-cell element. The positive and negative plates 20, 22 of each half-cell element 18 are electrically joined by connectors 26 (e.g. rivets) which pass through the divider 24, preferably at bosses 28. The connectors 26 are in fluid type connection with the divider 24. A number of connectors 26 and bosses 28 are provided on each divider 24 to insure uniform current collection and negative electrode spacing from the divider 24. In this regard, the bosses 28 space the negative electrodes 22 from the dividers 24 to provide sufficient electrolyte capacity within each cell to meet its stoichiometric requirements. A frame-like border 30 is on the periphery of the divider 24. Though it is preferred that the divider 24 be nonconductive and formed as a single unit with the nonconductive border 30, it is not necessary that it be such. For example, the divider could be a continuous sheet of metal, e.g. lead, which is sealed on its periphery to the frame 30. The frames 30 preferably comprise any of a number of plastics such as polypropylene, polyethylene, polystyrene and the like as well as their respective copolymers but of course thermosetting materials such as conventional battery box rubbers and the like are also acceptable. The several half-cell elements 18 are stacked with the contiguous frames 30 appropriately sealed to one another as by any known technique (e.g. with heat, solvents or adhesives) consistent with the composition of the frame 30. At the time the half-cell elements 18 are assembled to form the battery stack, microporous separators 32 are inserted between the positive electrode (20) of one half-cell element 18 and the negative electrode (22) of the next adjacent half-cell element 18. This separator 32 preferably extends to the edge of the cell in which it is used and there joins with the frame 30 to effectively bisect the cell. A preferred technique for accomplishing this provides a shoulder 62 (FIG. 3) on the frames 30 for receiving and holding the separator 32. The separator 32 itself may be any of the conventional microporous battery separators used to prevent interelectrode shorting due to "treeing." Such separators are well known to those in the art. For the particular Pb-acid application here involved we prefer to use separators which are ribbed, microporous, polyvinyl chloride sheets. At the top and bottom ends of the cell stack, negative and positive current collectors 38 and 40 respectively are provided. The positive and negative current collectors 38 and 40 are connected to the terminal members 46 and 48 which are in turn engaged by the terminal jacks 16. Top and bottom members 42 and 44 respectively are appropriately sealed to the frames 30 of the end half-cell elements 18.

A venting system 4 is best shown in FIGS. 2 and 3. Along one side of the battery 2, the frames 30 are notched to form vent ports 34. Each port 34 communicates directly with a separate cell compartment 36 formed between the several half-cell elements 18. Preferably the vent ports 34 are arranged along the side of battery 2 in the staircase fashion shown in FIG. 2 with no vertical overlapping of the ports 34. The vent ports 34 open into risers 6 located along the sides of the battery 2. Though two are shown, only one riser 6 is really necessary and, in fact, is preferred if for no other reason than manufacturing economics. When a single riser 6 is used, battery placement, e.g. in a vehicle, includes purposeful slight inclination (e.g. about 10° from horizontal) of the battery such that the single riser 6 would be at the high end of the cells being vented. The riser 6 contains a plurality of partitions 50 which divide it into a number of riser channels 52, one channel for each of the vent ports 34. In a preferred form, the bottom 54 of the riser 6 inclines at substantially the same rate as the incline of the staircase-like arrangement of the vent ports 34. In that preferred form, the bottom 54 of the riser 6 is located as close as possible though slightly below the vent ports 34. This minimizes electrolyte accumulation in the bottom of the channels 52. The riser channels 52 extend upwardly along the side of the battery 2 until they reach the top 42 of the battery where the open ends of the riser channels 52 meet the header 8. The partitions 50 are sealed to the side of the battery 2. The header 8, like the riser 6, includes a plurality of partitions 56 which divide the header 8 into a plurality of header channels 58. The header 8 is positioned such that the ends of the header channels 58 overlie the upper ends of the riser channels 52. The partitions 56 are sealed to the top 42 and the ends of the riser partitions 50. Vent openings 60 are provided through the header 8 at a point removed from the junction of the header 8 and risers 6. The vent openings 60 provide communication between the header channels 58 and the vent manifold 10 which overlies the openings 60 and is open to the atmosphere. An exhaust tube 12 may be provided for directing cell gases from the manifold 10 away from the immediate area of the battery, e.g. outside a vehicle.

This invention is particularly useful with low-gassing cells such as the low or non-antimonial lead acid type. In one particular application of this invention, the battery is 15 inches long, 15 inches wide and 2½ inches high. It contains 6 cells containing lead oxide positive plates and lead negative plates on about 0.055 inch thick lead-calcium grids. The elements 18 are one piece ethylene-propylene copolymer moldings having a divider thickness of about .070 inch and a frame thickness of 0.344 inch on the outside. The bosses spaced the negative electrode about .060 inch from the divider. The vent ports are about one (1) inch by 0.250 inch as are the cross sections of the corresponding riser and header channels.

While our invention has been disclosed primarily in terms of one particular embodiment thereof, we do not intend to be limited thereto except to the extent hereinafter set forth in the appended claims which follow.

We claim:

1. A low-silhouette, bi-polar-electrode type battery having a height dimension substantially less than its lateral dimension comprising:

a plurality of half-cell elements stacked one atop the other;

each of said half-cell elements including a positive electrode, a negative electrode, an intercell divider between said electrodes, conductor means electrically joining said electrodes through said divider and a nonconductive frame on the periphery of said divider sealingly engaging the frame of the next adjacent half-cell element;

adjacent half-cell elements forming a cell compartment for the positive electrode of one element, the negative electrode of the adjacent element and an electrolyte;

vent ports through said frames on at least one side of the battery communicating the inside of each compartment with a venting means;

venting means including a vent riser contiguous said ports and closed at its lower end, a vent header adjoining the upper end of the vent riser, and a vent manifold joined to the header at a location removed from the riser-header junction;

partitions inside the riser dividing it into a plurality of approximately vertical riser channels separately communicating one compartment's vent port with the vent header;

partitions in the header dividing it into a plurality of approximately horizontal header channels each separately communicating a single riser channel with the vent manifold; and a vent opening in each header channel communicating the corresponding header channel with the vent manifold, whereby each of the compartments is vented separately through its side via its own riser-header channels to a common vent manifold.

2. A low-silhouette, bi-polar-electrode type battery having a height dimension substantially less than its lateral dimension comprising:

a plurality of half-cell elements stacked one atop the other;

each of said half-cell elements including a positive electrode, a negative electrode, an intercell divider between said electrodes, conductor means electrically joining said electrodes through said divider and a nonconductive frame on the periphery of said divider sealingly engaging the frame of the next adjacent half-cell element;

adjacent half-cell elements forming a cell compartment for the positive electrode of one element, the negative electrode of the adjacent element and an electrolyte;

a vent port through each of said frames communicating the inside of the corresponding cell compartments with a venting means, the vent ports of successively stacked frames are aligned on an incline and offset from the next adjacent ports such that no one port is directly above or below another;

venting means including a vent riser contiguous said ports and closed at its lower end, a vent header adjoining the upper end of the vent riser, and a vent manifold joined to the header at a location removed from the riser-header junction;

closure means for the lower end of the vent riser adjacent the ports, which means closely follows the incline of the ports;

partitions inside the riser dividing it into a plurality of approximately vertical riser channels separately communicating one compartment's vent port with the vent header;

partitions in the header dividing it into a plurality of approximately horizontal header channels each separately communicating a single riser channel with the vent manifold; and a vent opening in each header channel communicating the corresponding header channel with the vent manifold, whereby each of the compartments is vented separately through its side via its own riser-header channels to a common vent manifold.

References Cited

UNITED STATES PATENTS

| 3,167,456 | 1/1965 | Schilke et al. | 136—10 |
| 3,360,403 | 12/1967 | Halsall | 136—170 |
| 3,488,220 | 1/1970 | Lyall et al. | 136—10 |

ANTHONY SKAPARS, Primary Examiner

U.S. Cl. X.R.

136—180